United States Patent
Arya et al.

(10) Patent No.: US 9,292,794 B2
(45) Date of Patent: Mar. 22, 2016

(54) VOLTAGE-BASED CLUSTERING TO INFER CONNECTIVITY INFORMATION IN SMART GRIDS

(71) Applicant: International Business Machines Corporation, Armonk, NY (US)

(72) Inventors: Vijay Arya, Bangalore (IN); Rajendu Mitra, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 303 days.

(21) Appl. No.: 13/967,603

(22) Filed: Aug. 15, 2013

(65) Prior Publication Data
US 2015/0052088 A1    Feb. 19, 2015

(51) Int. Cl.
G06N 5/04    (2006.01)
G06N 99/00    (2010.01)

(52) U.S. Cl.
CPC ............... *G06N 5/04* (2013.01); *G06N 99/005* (2013.01)

(58) Field of Classification Search
None
See application file for complete search history.

(56) References Cited

U.S. PATENT DOCUMENTS

| 8,121,741 | B2 | 2/2012 | Taft et al. |
| 8,207,726 | B2 | 6/2012 | Vaswani et al. |
| 2012/0221265 | A1 | 8/2012 | Arya et al. |
| 2012/0284280 | A1* | 11/2012 | Kumar .................... 707/743 |
| 2013/0013125 | A1 | 1/2013 | Booth |
| 2013/0024149 | A1* | 1/2013 | Nayar et al. ............... 702/72 |
| 2013/0136132 | A1 | 5/2013 | Abbot et al. |
| 2014/0039818 | A1 | 2/2014 | Arya et al. |

FOREIGN PATENT DOCUMENTS

WO    2013025836 A1    2/2013

OTHER PUBLICATIONS

Pezeshski et al. Consumer Phase Identification in a Three Phase Unbalanced LV Distribution Network. Innovative Smart Grid Technologies (ISGT Europe), 2012 3rd IEEE PES, Oct. 14-17, 2012.
Arya et al. Phase Identification in Smart Grids, Smart Grid Communications (SmartGridComm), 2011 IEEE, Oct. 17-20, 2011.
Rodrigues et al. Holistic Distributed Stream Clustering for Smart Grids, 20th European Conference on Artificial Intelligence (ECAI 2012), Montpellier, France, Aug. 27-31, 2012.

* cited by examiner

*Primary Examiner* — Kakali Chaki
*Assistant Examiner* — Michael Zidanic
(74) *Attorney, Agent, or Firm* — Ryan, Mason & Lewis, LLP

(57) ABSTRACT

Techniques, systems, and articles of manufacture for voltage-based clustering to infer connectivity information in smart grids. A method includes clustering multiple voltage time series measurements into one or more groups, wherein said multiple voltage time series measurements are derived from one or more sensors; determining a connectivity model based on the one or more groups; comparing the determined connectivity model to an existing connectivity model to detect one or more inconsistencies between the determined connectivity model and the existing connectivity model; and updating the existing connectivity model based on said one or more detected inconsistencies.

23 Claims, 7 Drawing Sheets

VOLTAGE-BASED CLUSTERING TO INFER CONNECTIVITY INFORMATION IN SMART GRIDS

FIELD OF THE INVENTION

Embodiments of the invention generally relate to information technology, and, more particularly, to smart grid-related technology.

BACKGROUND

Challenges exist in identifying and maintaining an accurate connectivity model of an energy distribution grid. The connectivity model specifies how customers and assets are interconnected downstream of a substation. Accordingly, customer-to-phase connectivity specifies which customer is connected to which phase of a feeder. Customer-to-transformer connectivity specifies which customer is connected to which distribution transformer. A common challenge faced by energy utilities includes an inaccurate connectivity model of their distribution network when compared to the actual connectivity that exists in the field. The accuracy of connectivity information can deteriorate over time due to changes made to the grid during repairs, maintenance, and/or restoration activities following storms and outages. Moreover, it can be expensive to track such changes and maintain an up-to-date connectivity model.

Existing approaches for identifying connectivity information are based on power-line communication (PLC). However, such approaches are expensive to deploy and do not scale well to large markets where signals need to propagate over long distances on a power line. Existing approaches for identifying customer-to-phase and transformer connectivity can also include analytics-based techniques that compare smart meter measurements with grid measurements. However, with such approaches, grid measurements are not always available. Further, grid measurements can be inaccurate and insufficient in number to identify customer phase. Additionally, such approaches can include a comparison of the energy balance between customers and the phase of a feeder, which requires measurements from all customers under that feeder. This condition is not always met, particularly, for example, when there are un-metered loads such as street and/or traffic lights and/or when a portion of the customers have analogue meters.

Accordingly, a need exists for techniques for identifying connectivity information, wherein such techniques incorporate and/or utilize measurements from customer smart meters and not from the grid.

SUMMARY

In one aspect of the present invention, techniques for voltage-based clustering to infer connectivity information in smart grids are provided. An exemplary computer-implemented method can include steps of clustering multiple voltage time series measurements into one or more groups, wherein said multiple voltage time series measurements are derived from one or more sensors; determining a connectivity model based on the one or more groups; comparing the determined connectivity model to an existing connectivity model to detect one or more inconsistencies between the determined connectivity model and the existing connectivity model; and updating the existing connectivity model based on said one or more detected inconsistencies.

In another aspect of the invention, an exemplary computer-implemented method can include steps of clustering multiple voltage time series measurements into one or more groups, wherein said multiple voltage time series measurements are derived from one or more sensors; determining a partial connectivity model based on the one or more groups; and supplementing the partial connectivity model with one or more energy measurements derived from a grid and one or more energy measurements from one or more customers to generate a determined connectivity model. The method also includes comparing the determined connectivity model to an existing connectivity model to detect one or more inconsistencies between the determined connectivity model and the existing connectivity model, and updating the existing connectivity model based on said one or more detected inconsistencies.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and configured to perform noted method steps. Yet further, another aspect of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1:
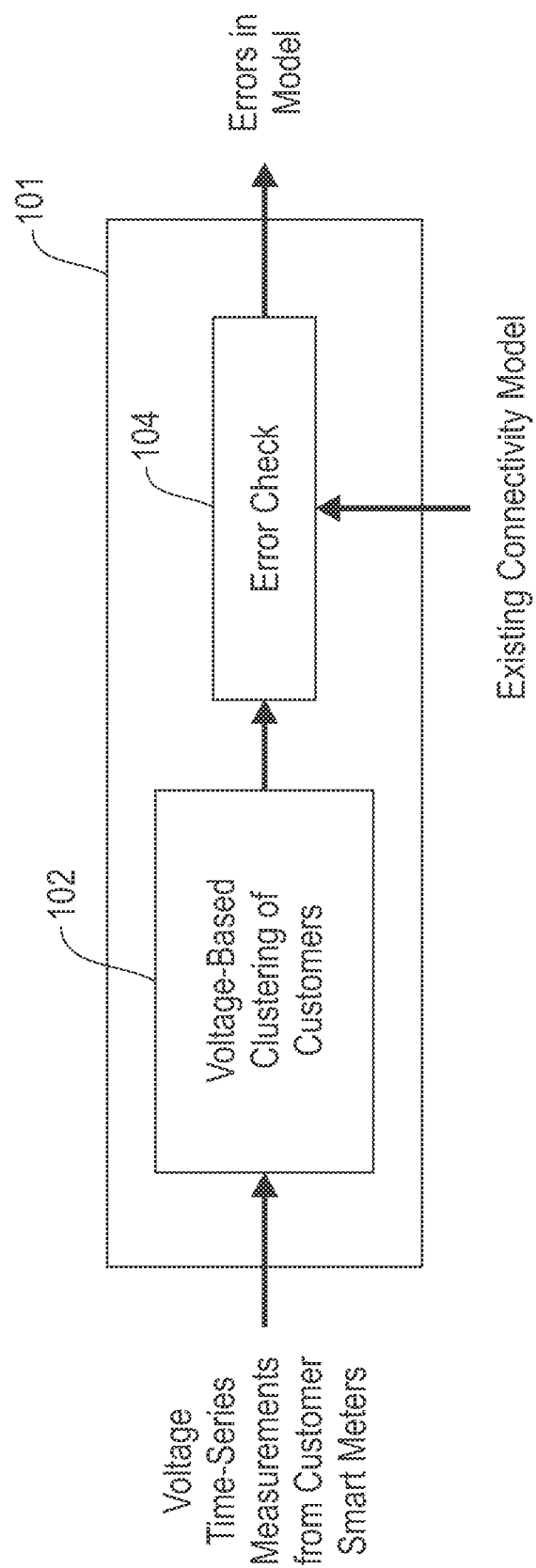
FIG. 1 is a diagram illustrating voltage-based clustering of customers to retrieve connectivity information, according to an embodiment of the present invention.

A distribution grid originates from a distribution substation that serves customers in a geographical area. A substation feeds one or more feeder circuits that carry power either directly to industrial customers or to low-voltage distribution transformers (DTs) that step down the voltage further to serve customers. A feeder includes three transmission lines that carry alternating current (AC) power with voltage waveforms shifted by 120 degrees. These three transmission lines are referred to as phases and are commonly labeled as phase A, phase B, and phase C. Each DT receives power by tapping onto one of the three phases of a feeder and commonly serves single-phase customers. Some DTs that serve larger three-phase loads, such as super-markets and office buildings, are generally three-phase.

As noted herein, a connectivity model (CM) records how the customers and assets are interconnected in the field. The CM is needed in the operations and maintenance of distribution networks. For instance, a CM is required by the outage management system (OMS) to accurately assess the magnitude of faults in a distribution grid. A distribution management system (DMS) uses the CM for fault detection, isolation, and service restoration (FDIR) and also to conduct accurate power-flow calculations. An inaccurate CM may lead to incorrect diagnosis of faults, suboptimal response, and faulty voltage profiles of the distribution grid, which can affect the reliability of energy delivery to the customer.

A distribution system is effectively a large power circuit with a number of interconnected sub-circuits corresponding to different phases, distribution transformers, and feeders. Therefore, the voltage values at different locations are closely related according to the electrical interconnections in the system. Because conductors exhibit impedance, the voltage is not constant throughout the system. The voltage drops closer to the load and/or customer and is a function of the nature and spread of loads on the feeder. The AC voltage varies as a sine wave and meters and/or sensors measure and report the root mean square (RMS) value of the voltage.

The techniques described herein leverage the fact that the voltage values at measurement locations in the same sub-circuit may be more similar to each other than to those in different sub-circuits. For instance, if the voltage in a sub-circuit varies, it is likely that all of the measurement locations in that sub-circuit observe this variation. Similarly, the values at measurement locations closer to each other in the sub-circuit may be more than compared to those values at measurement locations that are farther away due to the drop across the impedance of the line segment. Thus, by analyzing the time series of voltage measurements from a set of locations, one or more embodiments of the invention includes inferring connectivity relationships corresponding to those locations.

As described herein, an aspect of the present invention includes the partitioning of customers in smart grids to recover connectivity information. At least one embodiment of the invention includes clustering a time series of voltage measurements from customer-associated smart meters into at most three groups, such that each group corresponds to a different phase. Because customers on a phase are effectively on one circuit in parallel, the voltage values of such customers are generally more correlated and vary together. In contrast, the voltages of customers on different phases are generally less correlated and may not vary together. Accordingly, at least one embodiment of the invention includes clustering the time series of voltage measurements from different customers using correlation as the distance metric between the voltage time series (for example, 1—Pearson correlation coefficient).

As described herein, a connectivity model of a distribution grid details how customers and distribution transformers are interconnected. Accordingly, at least one embodiment of the invention includes clustering a time series of voltage measurements from one or more customer-associated smart meters that belong to the same phase, such that each group corresponds to a distribution transformer. Within one phase, customers on the same transformer may be geographically close to one another in the distribution circuit due to their connectivity. Therefore, voltages, amplitudes and variations associated with those customers are expected to be similar. Accordingly, at least one embodiment of the invention includes clustering the time series of voltage measurements from customers under the same phase using $L_1$ norm as the distance metric between the voltage time series ($L_1$ distance is also known as the city block distance).

As also described herein, a connectivity model of a distribution grid may additionally detail the connectivity between assets in the distribution network, such as, for example, which distribution transformer is connected to which lateral of a feeder. Accordingly, at least one embodiment of the invention includes clustering a time series of voltage measurements from one or more transformer-associated meters that belong to the same feeder, such that each group corresponds to a different lateral of the feeder.

As further described herein, at least one embodiment of the invention includes using time series clustering techniques with one or more distance metrics to identify multiple elements of a connectivity model such as, for example, a customer-to-transformer element, a customer-to-phase element, and a customer-to-building connectivity element. Additionally, at least one embodiment of the invention can include using an existing (and partially inaccurate) connectivity model as input and correcting the connectivity model using only customer voltage measurements. Also, aspects of the invention also do not require power line communication (PLC), do not modify the voltage at a feeder level, and do not cause momentary power interruptions.

As also detailed herein, at least one embodiment of the invention includes supporting time series measurements that have partial overlap across customers and across time. Additionally, in at least one embodiment of the invention, clustering can be performed on a partial subset of customers in the presence of un-metered and/or analogue-metered customers, street and/or traffic lights, etc. Also, different groups of customers measured at partially overlapping times can be clustered separately. Further, in at least one embodiment of the invention, customer voltage time series measurements are treated as vectors and clustered based on one or more distance metrics such as correlation distance, $L_1$ distance, and $L_2$ distances. Also, if the number of clusters is not known, the number of clusters can be estimated using statistics that are functions of intra- and inter-cluster distances such as, for example, the Silhouette index, the Krzanowski-Lai index, the Davies-Bouldin index, and the Gap statistic.

FIG. 1 is a diagram illustrating voltage-based clustering of customers to retrieve connectivity information, according to an embodiment of the present invention. By way of illustration, FIG. 1 depicts techniques for grouping voltage measurement locations together based on the same upstream grid asset. Specifically, FIG. 1 depicts a system 101, into which voltage time series measurements from customer smart meters are provided to a component 102 for determining voltage-based clustering of customers. No measurements from the grid side are utilized in the embodiment depicted in FIG. 1.

Additionally, component 102 clusters customers into groups to infer a connectivity model. By way of example, phase connectivity leads to customers on the same phase being classified into one group, while transformer connectivity leads to customers on the same transformer being classified into one group.

As also depicted in FIG. 1, component 102 provides the inferred connectivity model to component 104 to determine the presence of any errors in an existing connectivity model, which is also provided to component 104. By way of example, component 104 compares the inferred connectivity model to the existing connectivity model to detect locations where there are errors and/or inconsistencies in the existing connectivity model as well as to reconfirm the existing connectivity model after an outage and restoration activities.

Further, an example embodiment of the invention such as depicted in FIG. 1 can be used to detect one or more feeder circuits in the grid that have an inconsistent connectivity model. Customers under a feeder circuit can be partitioned into clusters using corresponding voltage measurements such that customers in the same group belong to the same phase. As such, it can be determined whether all customers assigned to the same phase in the existing connectivity model belong to the same cluster to identify inconsistencies. A similar procedure can be used to detect inconsistencies in the connectivity information between customers and distribution transformers.

At least one embodiment of the invention includes taking measurements from a micro-grid. By way of example and illustration, consider a micro-grid as including one three-phase AC generation source that powers several buildings, wherein each building has several different appliances and/or users. By way of instrumentation, assume, in furtherance of this example, the existence and use of multiple measurement points on different phases in the buildings, with meters deployed at the entrance of the buildings and internal power sockets.

In this merely illustrative example, the meters may collect voltage measurements (such as RMS values). Additionally, the measurements do not need to be fully time-synchronized, as the data can be ultimately binned or grouped and averaged into bins (for example, per 10 seconds, per 60 seconds, etc). Outliers (for example, values out of a regular voltage range) can also be filtered out of the measurements.

In at least one embodiment of the invention, voltage measurements at different locations are clustered to separate measurement locations on different phases. Such an embodiment can include the use of a clustering algorithm such as, for example, a k-means algorithm based on a correlation distance metric. Additionally, within each phase, separate measurement locations can be separated into different buildings. Such an embodiment can include the use of a clustering algorithm such as, for example, a k-means algorithm based on a $L_1$ distance metric.

As also noted herein, the exact number of clusters may be unknown in advance. Depending on the context, the number of clusters either represents the number of different phases or the buildings covering the measurement locations. Accordingly, at least one embodiment of the invention includes using statistics, as noted above, to estimate the number of clusters.

In at least one embodiment of the invention, a system such as depicted in FIG. 1 can be implemented to correct a connectivity model without additional grid measurements as well as to improve the accuracy of one or more energy-based optimization solutions.

Figure 2:
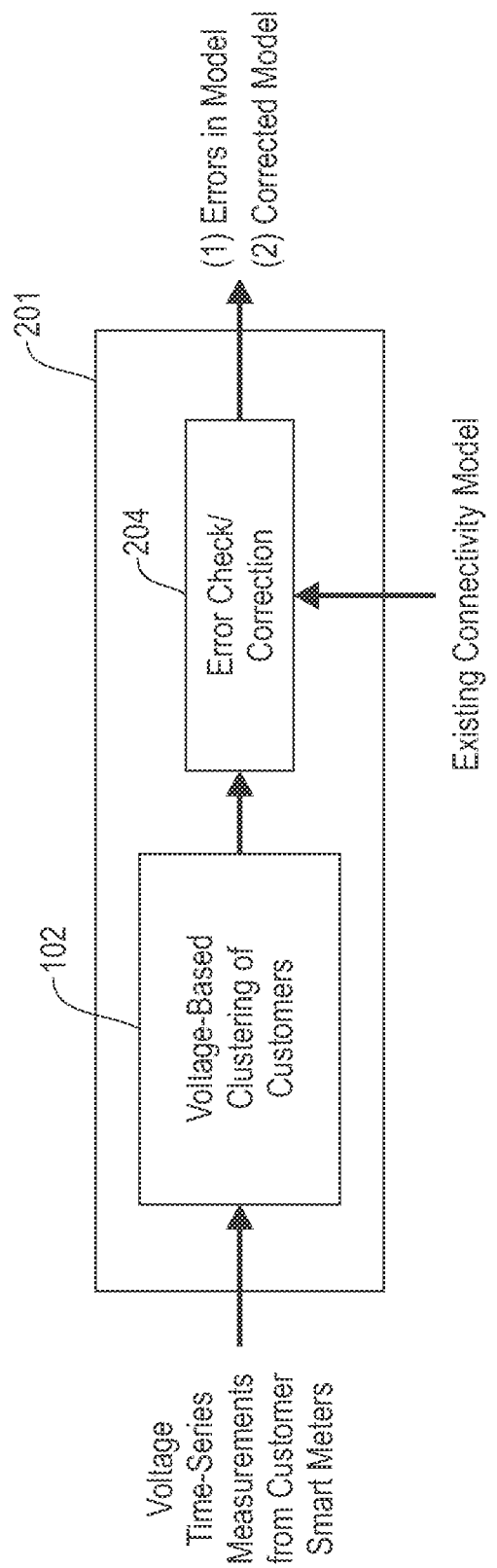
FIG. 2 is a diagram illustrating voltage-based clustering of customers to retrieve connectivity information, according to an embodiment of the present invention.

Accordingly, FIG. 2 is a diagram illustrating voltage-based clustering of customers to retrieve connectivity information, according to an embodiment of the present invention. By way of illustration, FIG. 2 depicts a system 201, into which voltage time series measurements from customer smart meters are provided to component 102 for determining voltage-based clustering of customers. Component 102 clusters customers into groups to infer a connectivity model.

As also depicted in FIG. 1, component 102 provides the inferred connectivity model to component 204 to determine the presence of any errors in an existing connectivity model, which is also provided to component 204. Component 204 also inserts and/or executes corresponding corrections to the existing connectivity model and ultimately outputs the corrected connectivity model as well as an identification of the errors contained therein.

By way of example, if the existing model has a low error rate, the error rate can be corrected with the help of customer clusters as follows. Given customer clusters such as determined via component 102, at least one embodiment of the invention can include determining, in the existing connectivity model, to which phase the majority of customers are assigned, and selecting this assignment for the connectivity.

Figure 3:
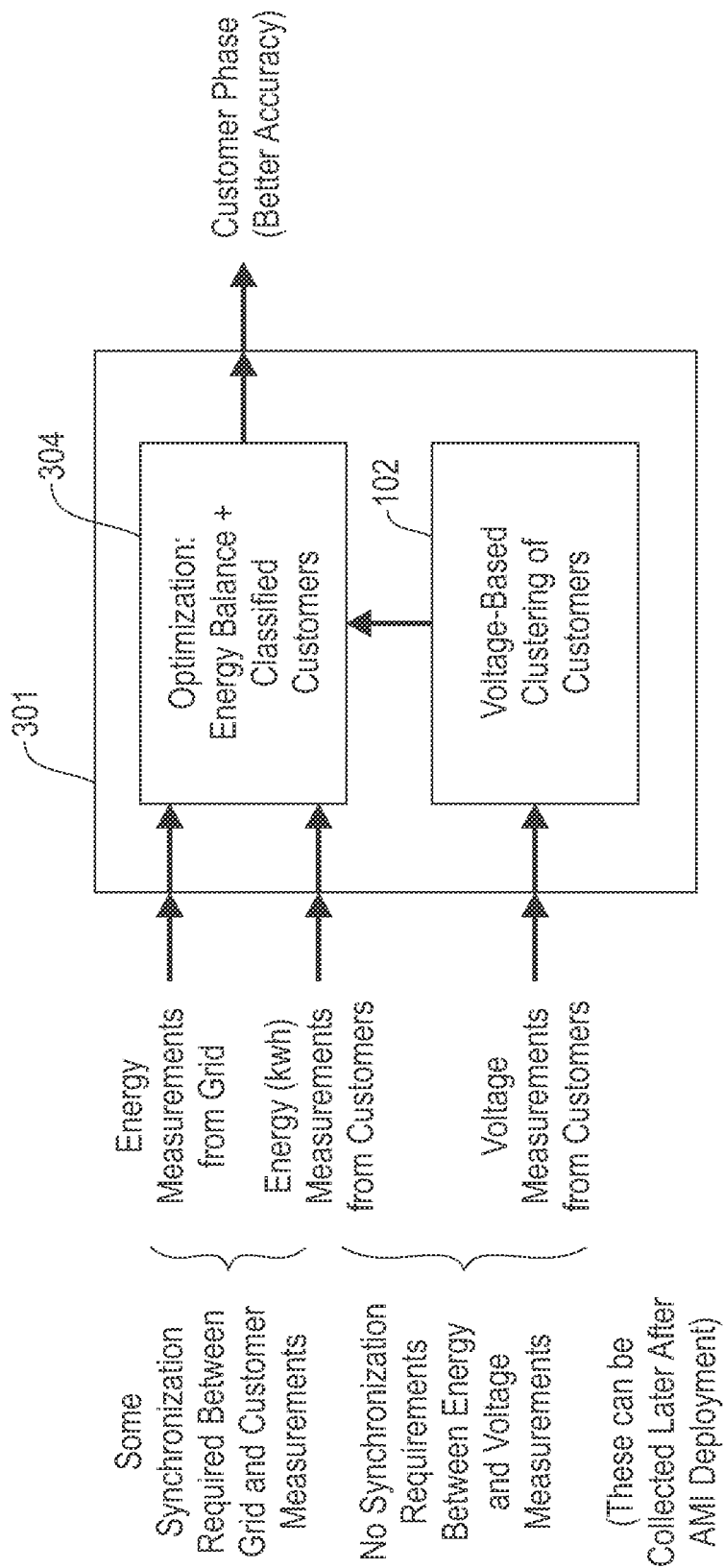
FIG. 3 is a diagram illustrating voltage-based clustering of customers to retrieve connectivity information, according to an embodiment of the present invention.

FIG. 3 is a diagram illustrating voltage-based clustering of customers to retrieve connectivity information, according to an embodiment of the present invention. By way of illustration, FIG. 3 depicts a system 301, into which voltage time series measurements from customers are provided to component 102 for determining voltage-based clustering of customers. Component 102, as noted herein, clusters customers into groups to infer a connectivity model.

As also depicted in FIG. 3, component 102 provides the inferred connectivity model to component 304 for optimization. Component 304 combines an energy-balance optimization technique with voltage measurements from customers to improve the accuracy of the inferred connectivity model. Specifically, as depicted in FIG. 3, energy measurements from the grid and energy measurements from customers (for example, kilowatt hours (KWH)) are provided to component 304 as input for an energy balance optimization technique, which is then combined with the classified customer information contained within the inferred connectivity model to ultimately output a customer phase (for example, with improved accuracy).

The energy-balance optimization techniques include checking the energy (or load in KWH) measured at an upstream asset in the distribution grid with the energy (or load in KWH) measured by customers to determine connectivity information. If a subset of customers with aggregate energy that matches the energy at the asset, it is assumed that this subset is connected to that upstream asset (a phase, transformer, feeder, etc). If measurements from the grid are inaccurate or insufficient, such optimization techniques may result in erroneous connectivity information. By clustering customers using corresponding voltage measurements, the clustered results can be used as constraints to for such optimization techniques to improve accuracy. For example, for identifying phase connectivity, a constraint can be introduced that two customers clustered into the same group should also be assigned the same phase in the optimization.

As also noted in FIG. 3, some synchronization may be required between grid and customer energy measurements, while no synchronization requirements exist between customer energy and voltage measurements. Additionally, in at least one embodiment of the invention, the customer voltage measurements can be collected after advanced metering infrastructure (AMI) deployment.

By way of illustration, an example use case implementing a system such as depicted in FIG. 3 can include previous monthly energy measurements collected from customers, coarse-grained supervisory control and data acquisition (SCADA) grid measurements, and new voltage measurements collected from recently-deployed customer smart meters. In such a use case, the ultimate output includes a more accurate connectivity model.

Figure 4:
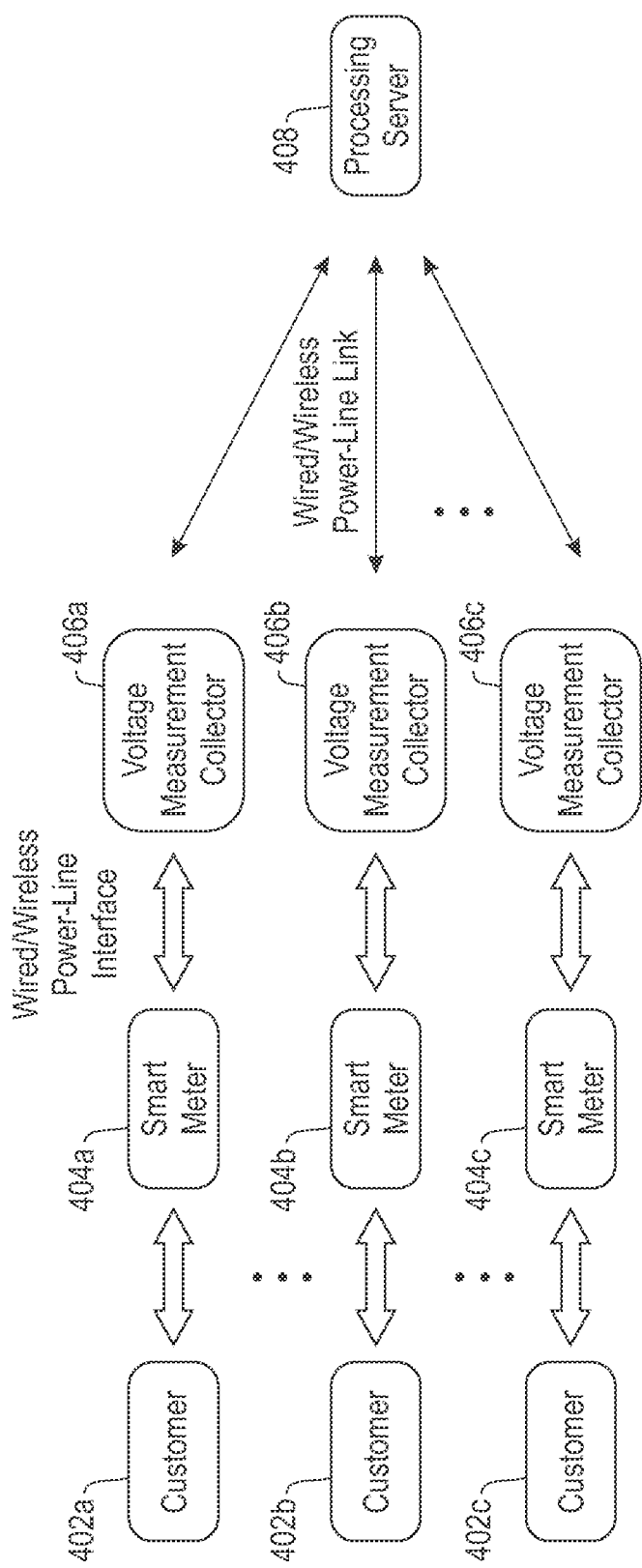
FIG. 4 is a diagram illustrating a system that uses distributed measurements of voltage to retrieve connectivity information, according to an embodiment of the present invention.

FIG. 4 is a diagram illustrating a system that uses distributed measurements of voltage to retrieve connectivity information, according to an embodiment of the present invention. By way of illustration, FIG. 4 depicts customers 402a through 402c (hereinafter, collectively referred to as customers 402) associated with consumer smart meters 404a through 404c (hereinafter, collectively referred to as smart meters 404).

Additionally, FIG. 4 depicts voltage measurement collectors 406a through 406c (hereinafter, collectively referred to as voltage measurement collectors 406) which interface with the smart meters 404. The interface between the voltage measurement collectors 406 and the smart meters 404 can include, for example, a wired connection, a wireless connection, and/or a power-line connection.

The voltage measurement collectors 406 collect periodic synchronous measurements of voltage from the smart meters 404. Subsequently, the voltage measurement collectors 406 send measurement messages, based on the collected periodic synchronous measurements of voltage, to one or more processing servers 408 for processing. By way of illustration, a processing server can represent and/or carry out the actions of the example systems depicted in FIGS. 1-3. As also noted in FIG. 4, the connection between the voltage measurement collectors 406 and the processing server 408 can include, for example, a wired connection, a wireless connection, and/or a power-line connection.

Figure 5:
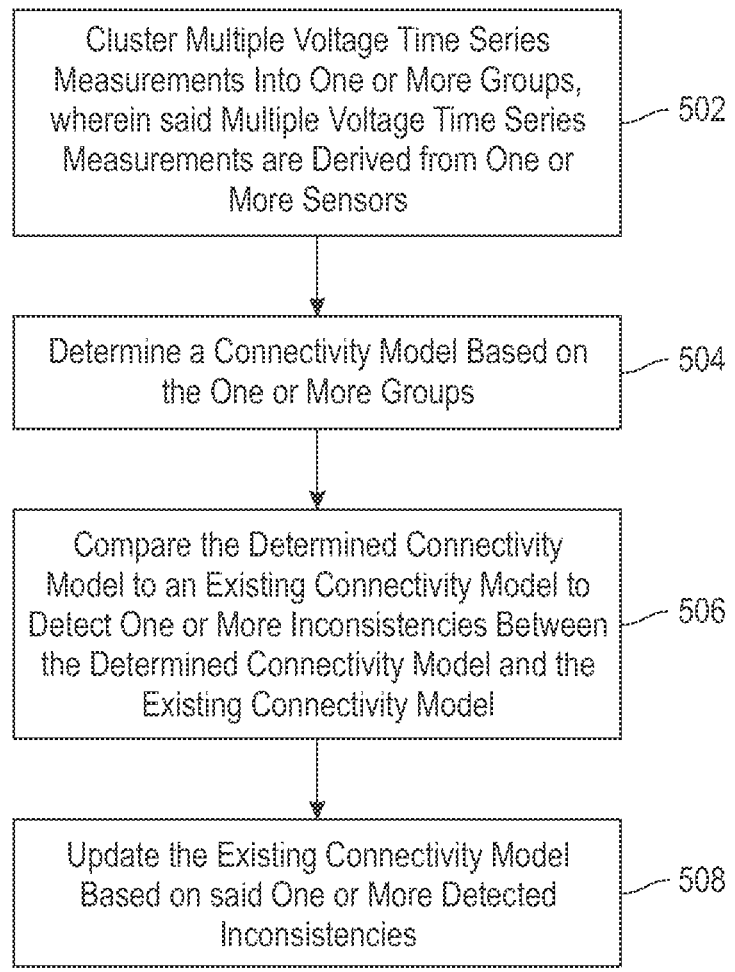
FIG. 5 is a flow diagram illustrating techniques according to an embodiment of the invention.

FIG. 5 is a flow diagram illustrating techniques according to an embodiment of the present invention. Step 502 includes clustering multiple voltage time series measurements into one or more groups, wherein said multiple voltage time series measurements are derived from one or more sensors. The sensors can include, for example, a set of multiple customer-associated meters, a set of multiple smart plugs on customer premises, a set of transformer meters, a set of feeder meters and/or a set of supervisory control and data acquisition devices.

Clustering can include, for example, clustering the multiple voltage time series measurements based on common phase associations, based on one or more distance metrics, based on one or more clustering algorithms, and based on common circuit associations.

Step 504 includes determining a connectivity model based on the one or more groups. As detailed herein, the connectivity model includes information pertaining to how one or more customers and one or more assets are interconnected together in a network.

Step 506 includes comparing the determined connectivity model to an existing connectivity model to detect one or more inconsistencies between the determined connectivity model and the existing connectivity model. At least one embodiment of the invention can also include comparing the determined connectivity model to an existing connectivity model to reconfirm the existing connectivity model after an outage and/or one or more restoration activities.

Step 508 includes updating the existing connectivity model based on said one or more detected inconsistencies. The techniques depicted in FIG. 5 can also include generating a corrected version of the determined connectivity model and/or a corrected version of the existing connectivity model incorporating the one or more detected inconsistencies, as well as outputting the detected inconsistencies and/or corrected model(s) to a display.

Figure 6:
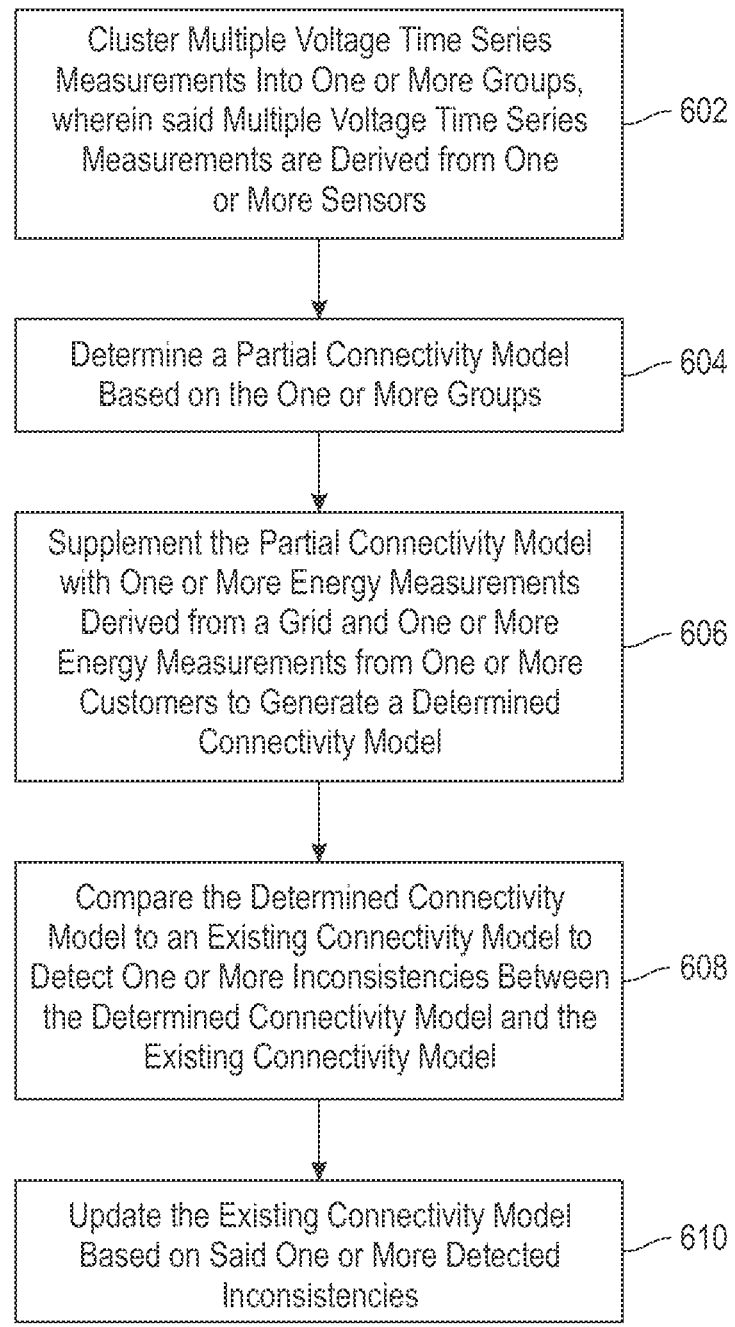
FIG. 6 is a flow diagram illustrating techniques according to an embodiment of the invention.

FIG. 6 is a flow diagram illustrating techniques according to an embodiment of the invention. Step 602 includes clustering multiple voltage time series measurements into one or more groups, wherein said multiple voltage time series measurements are derived from one or more sensors. As detailed above in connection with the techniques depicted in FIG. 5, the sensors can include, for example, a set of multiple customer-associated meters, a set of multiple smart plugs on customer premises, a set of transformer meters, a set of feeder meters and/or a set of supervisory control and data acquisition devices.

Also similar to the techniques depicted in FIG. 5, the clustering in step 602 can include, for example, clustering the multiple voltage time series measurements based on common phase associations, based on one or more distance metrics, based on one or more clustering algorithms, and based on common circuit associations.

Step 604 includes determining a partial connectivity model based on the one or more groups. Step 606 includes supplementing the partial connectivity model with one or more energy measurements derived from a grid and one or more energy measurements from one or more customers to generate a determined connectivity model.

Step 608 includes comparing the determined connectivity model to an existing connectivity model to detect one or more inconsistencies between the determined connectivity model and the existing connectivity model. Step 610 includes updating the existing connectivity model based on said one or more detected inconsistencies. The techniques depicted in FIG. 6 can also include outputting the detected inconsistencies and/or updated model(s) to a display.

Additionally, the techniques depicted in FIG. 6 can also include obtaining the one or more energy measurements derived from a grid and the one or more energy measurements from one or more customers in synchronization.

The techniques depicted in FIG. 5 and FIG. 6 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 5 and FIG. 6 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in a computer readable medium having computer readable program code embodied thereon.

An aspect of the invention or elements thereof can be implemented in the form of an apparatus including a memory and at least one processor that is coupled to the memory and configured to perform exemplary method steps.

Figure 7:
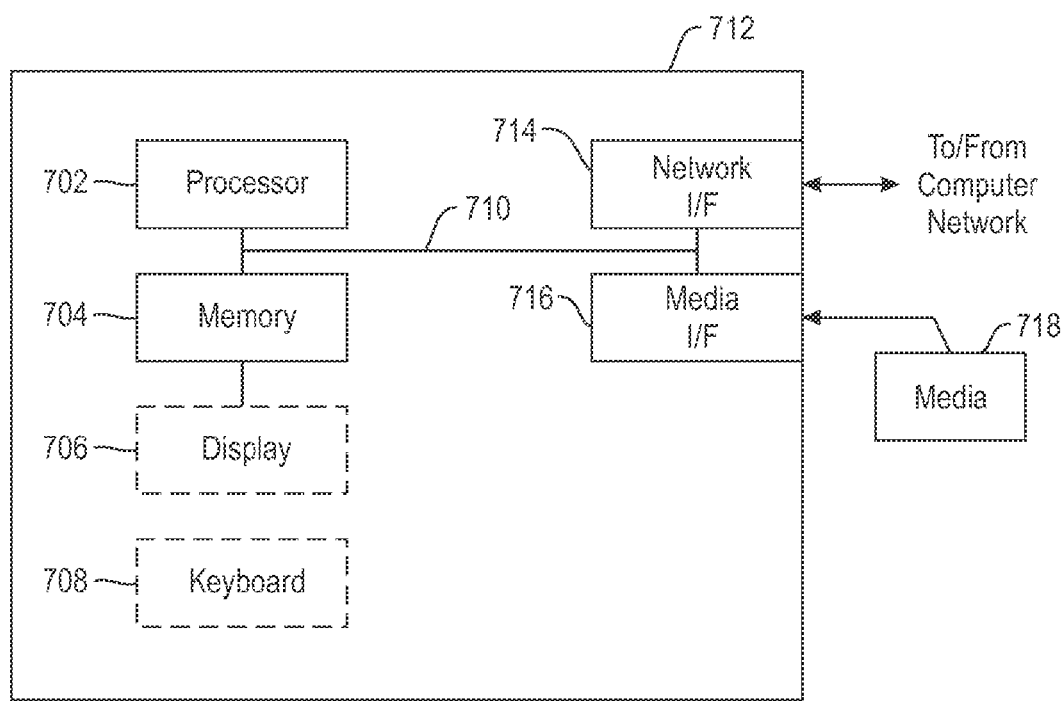
FIG. 7 is a system diagram of an exemplary computer system on which at least one embodiment of the invention can be implemented.

Additionally, an aspect of the present invention can make use of software running on a general purpose computer or workstation. With reference to FIG. 7, such an implementation might employ, for example, a processor 702, a memory 704, and an input/output interface formed, for example, by a display 706 and a keyboard 708. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 702, memory 704, and input/output interface such as display 706 and keyboard 708 can be interconnected, for example, via bus 710 as part of a data processing unit 712. Suitable interconnections, for example via bus 710, can also be provided to a network interface 714, such as a network card, which can be provided to interface with a computer network, and to a media interface 716, such as a diskette or CD-ROM drive, which can be provided to interface with media 718.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 702 coupled directly or indirectly to memory elements 704 through a system bus 710. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 708, displays 706, pointing devices, and the like) can be coupled to the system either directly (such as via bus 710) or through intervening I/O controllers (omitted for clarity).

Network adapters such as network interface 714 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 712 as shown in FIG. 7) running a server program. It will be understood that such a physical server may or may not include a display and keyboard.

As noted, aspects of the present invention may take the form of a computer program product embodied in a computer readable medium having computer readable program code embodied thereon. Also, any combination of computer readable media may be utilized. The computer readable medium may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM), flash memory, an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using an appropriate medium, including but not limited to wireless, wireline, optical fiber cable, radio frequency (RF), etc., or any suitable combination of the foregoing.

Computer program code for carrying out operations for aspects of the present invention may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, an aspect of the invention includes an article of manufacture tangibly embodying computer readable instructions which, when implemented, cause a computer to carry out a plurality of method steps as described herein.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 702. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed.

At least one aspect of the present invention may provide a beneficial effect such as, for example, inferring a connectivity model of a distribution grid solely from a time series of voltage measurements available at customer meters.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   clustering multiple voltage time series measurements into multiple groups based on one or more distance metrics comprising at least (i) a distance metric that associates each of multiple voltage time series measurements with one of multiple sub-circuits, and (ii) a distance metric pertaining to distance between each of the voltage time series measurements that are associated with the same one of the multiple sub-circuits, wherein said multiple voltage time series measurements are derived from one or more sensors;
   determining a connectivity model of the multiple groups, wherein said determining comprises inferring multiple connectivity relationships based on said clustering;
   comparing the determined connectivity model to an existing connectivity model to detect one or more inconsistencies between the determined connectivity model and the existing connectivity model; and
   updating the existing connectivity model based on said one or more detected inconsistencies;
   wherein at least one of the steps is carried out by a computing device.

2. The method of claim 1, wherein said one or more sensors comprise a set of multiple customer-associated meters.

3. The method of claim 1, wherein said one or more sensors comprise a set of multiple smart plugs on customer premises.

4. The method of claim 1, wherein said one or more sensors comprise a set of transformer meters.

5. The method of claim 1, wherein said one or more sensors comprise a set of feeder meters.

6. The method of claim 1, wherein said one or more sensors comprise a set of supervisory control and data acquisition devices.

7. The method of claim 1, comprising:
generating a corrected version of the determined connectivity model and/or a corrected version of the existing connectivity model incorporating the one or more detected inconsistencies.

8. The method of claim 1, wherein said clustering comprises clustering the multiple voltage time series measurements further based on one or more common phase associations.

9. The method of claim 1, wherein said clustering comprises clustering the multiple voltage time series measurements further based on one or more clustering algorithms.

10. The method of claim 1, wherein said clustering comprises clustering the multiple voltage time series measurements further based on one or more common circuit associations.

11. The method of claim 1, wherein said connectivity model comprises information pertaining to how one or more customers and one or more assets are interconnected together in a network.

12. The method of claim 1, wherein said comparing comprises comparing the determined connectivity model to the existing connectivity model to reconfirm the existing connectivity model after an outage and/or one or more restoration activities.

13. An article of manufacture comprising a non-transitory computer readable storage medium having computer readable instructions tangibly embodied thereon which, when implemented, cause a computer to carry out a plurality of method steps comprising:
clustering multiple voltage time series measurements into multiple groups based on one or more distance metrics comprising at least (i) a distance metric that associates each of multiple voltage time series measurements with one of multiple sub-circuits, and (ii) a distance metric pertaining to distance between each of the voltage time series measurements that are associated with the same one of the multiple sub-circuits, wherein said multiple voltage time series measurements are derived from one or more sensors;
determining a connectivity model of the multiple groups, wherein said determining comprises inferring multiple connectivity relationships based on said clustering;
comparing the determined connectivity model to an existing connectivity model to detect one or more inconsistencies between the determined connectivity model and the existing connectivity model; and
updating the existing connectivity model based on said one or more detected inconsistencies.

14. A system comprising:
a memory; and
at least one processor coupled to the memory and configured for:
clustering multiple voltage time series measurements into multiple groups based on one or more distance metrics comprising at least (i) a distance metric that associates each of multiple voltage time series measurements with one of multiple sub-circuits, and (ii) a distance metric pertaining to distance between each of the voltage time series measurements that are associated with the same one of the multiple sub-circuits, wherein said multiple voltage time series measurements are derived from one or more sensors;
determining a connectivity model of the multiple groups, wherein said determining comprises inferring multiple connectivity relationships based on said clustering;
comparing the determined connectivity model to an existing connectivity model to detect one or more inconsistencies between the determined connectivity model and the existing connectivity model; and
updating the existing connectivity model based on said one or more detected inconsistencies.

15. A method comprising:
clustering multiple voltage time series measurements into multiple groups based on one or more distance metrics comprising at least (i) a distance metric that associates each of multiple voltage time series measurements with one of multiple sub-circuits, and (ii) a distance metric pertaining to distance between each of the voltage time series measurements that are associated with the same one of the multiple sub-circuits, wherein said multiple voltage time series measurements are derived from one or more sensors;
determining a partial connectivity model of the multiple groups, wherein said determining comprises inferring multiple connectivity relationships based on said clustering;
supplementing the partial connectivity model with one or more energy measurements derived from a grid and one or more energy measurements from one or more customers to generate a determined connectivity model;
comparing the determined connectivity model to an existing connectivity model to detect one or more inconsistencies between the determined connectivity model and the existing connectivity model; and
updating the existing connectivity model based on said one or more detected inconsistencies;
wherein at least one of the steps is carried out by a computing device.

16. The method of claim 15, wherein said one or more sensors comprise a set of multiple customer-associated meters.

17. The method of claim 15, wherein said one or more sensors comprise a set of multiple smart plugs on customer premises.

18. The method of claim 15, wherein said one or more sensors comprise at least one of a set of transformer meters, a set of feeder meters, and a set of supervisory control and data acquisition devices.

19. The method of claim 15, comprising:
obtaining the one or more energy measurements derived from a grid and the one or more energy measurements from one or more customers in synchronization.

20. The method of claim 15, wherein said clustering comprises clustering the multiple voltage time series measurements further based on one or more common phase associations.

21. The method of claim 15, wherein said clustering comprises clustering the multiple voltage time series measurements further based on one or more clustering algorithms.

22. The method of claim 15, wherein said clustering comprises clustering the multiple voltage time series measurements further based on one or more common circuit associations.

23. An article of manufacture comprising a non-transitory computer readable storage medium having computer readable instructions tangibly embodied thereon which, when implemented, cause a computer to carry out a plurality of method steps comprising:

clustering multiple voltage time series measurements into multiple groups based on one or more distance metrics comprising at least (i) a distance metric that associates each of multiple voltage time series measurements with one of multiple sub-circuits, and (ii) a distance metric pertaining to distance between each of the voltage time series measurements that are associated with the same one of the multiple sub-circuits, wherein said multiple voltage time series measurements are derived from one or more sensors;

determining a partial connectivity model of the multiple groups, wherein said determining comprises inferring multiple connectivity relationships based on said clustering;

supplementing the partial connectivity model with one or more energy measurements derived from a grid and one or more energy measurements from one or more customers to generate a determined connectivity model;

comparing the determined connectivity model to an existing connectivity model to detect one or more inconsistencies between the determined connectivity model and the existing connectivity model; and updating the existing connectivity model based on said one or more detected inconsistencies.

\* \* \* \* \*